United States Patent [19]
Holt

[11] Patent Number: 5,280,602
[45] Date of Patent: Jan. 18, 1994

[54] TASK FILE WITH AUTOMATIC UPDATE OF TASK FILE REGISTERS

[75] Inventor: Michael Holt, Mission Viejo, Calif.

[73] Assignee: Silicon Systems, Inc., Tustin, Calif.

[21] Appl. No.: 738,268

[22] Filed: Jul. 31, 1991

[51] Int. Cl.$^5$ ............................................. G06F 9/00
[52] U.S. Cl. ............................... 395/425; 364/DIG. 1; 364/260.1; 364/248.1; 364/236.2
[58] Field of Search ......................................... 395/425

[56] References Cited

U.S. PATENT DOCUMENTS

| | | | |
|---|---|---|---|
| 3,771,143 | 11/1973 | Taylor | 364/206 |
| 4,425,615 | 1/1984 | Swenson et al. | 395/425 |

OTHER PUBLICATIONS

Intel Microsystem Components Handbook; Microprocessors and Peripherals, vol. II, 82062 Winchester Disk Controller, 1985, pp. 5-574 to 5-594.

*Primary Examiner*—David L. Robertson
*Attorney, Agent, or Firm*—Hecker & Harriman

[57] ABSTRACT

The present invention is a network which automates the operation of the IBM AT task file registers used in hard disk drives and hard disk controller systems that are compatible with the IBM AT BIOS (Basic Input/Output System). The present invention provides registers that interface between the disk controller circuit and the IBM AT computer. The network utilizes four 8-bit digital upcounters, one 4-bit digital upcounter, an 8-bit data register and a 4-bit data register. These counters indicate the physical address of the sector of data being transferred and are incremented or reloaded as required as each sector of data is transferred. The present invention employs the 8-bit data register, the maximum sector register, to hold the number of sectors and the 4-bit register, the maximum head register, to hold the number of heads on the disk drive. The counters are then reloaded or incremented as required based upon the contents of the maximum head and maximum sector registers without microprocessor support as each sector is transferred. External circuitry (typically a microprocessor) is not required in any of these operations. Having an automatic update of the AT task file is desirable for it reduces the command overhead and microprocessor band width requirement in supporting the AT task file.

9 Claims, 4 Drawing Sheets

TASK FILE WITH AUTOMATIC UPDATE OF TASK FILE REGISTERS

BACKGROUND OF THE PRESENT INVENTION

1. Field of the Invention

This invention relates to the field of hard disk controller systems that are compatible with the IBM AT BIOS (Basic Input/Output System) and in particular the AT interface between host and microprocessor.

2. Background Art

Computers and their associated disk drives are used for storing large amounts of data. Typically, data is stored on a magnetic disk in a series of concentric tracks on the surface of the disk. A read/write head moves back and forth radially on the disk so that it can be selectively positioned over one of the tracks. To effectively read and write data, it is necessary that the position of the tracks in relation to the head be known. In addition to knowing which track the head is over, it is necessary to know where on that particular track the head is positioned. A servo pattern is used to provide position information. One type of servo pattern is the sector servo, which comprises bursts of servo information disposed on a disk surface in between data areas.

Also, it is necessary to know at which circumferential position in the track the head is located. This is done by an "index" which is generally defined at a specific circumferential location in the servo pattern to indicate the start/end location of each data track. Also necessary for proper addressing is cylinder information which is a combination of all the tracks that are currently accessed by the heads in a drive. Once in position over a track, the head remains in place as the track rotates beneath it, allowing the head to read or write data on the track.

The host computer communicates with the disk drive through an interface such as the AT Bus interface. An AT Bus interface often contains several registers that the host uses to communicate with the disk drive controller. The entire set of registers is collectively referred to as an AT Task File. The control registers of the interface are used for writing and reading data and also issuing commands between the host and the disk microprocessor. The control registers also provide status information including error status to the host. Other registers of the AT Task File specify the physical address for a read or write command. All of these registers that comprise the interface are necessary for proper coordination between the host and drive.

Thus, data information as well as status information from the disk is then provided to the AT Bus interface before the data information is provided to the host computer. The AT task file registers within the AT interface receives the status information from the drive for updating the registers. After each data sector is transferred, AT task file registers of the AT interface are updated in order to indicate the physical address of the sector of data being transferred.

A block diagram of the AT interface is given in FIG. 4. The host computer block 120 and disk drive microprocessor 110 are coupled to AT interface 130 through bus line 160. AT interface block 130 is also coupled to AT task file block 140 which is a part of AT interface 130. AT task file 140 is coupled to microprocessor 110. AT interface is coupled to other electronics block 170 which is coupled to Head Drive Assembly (HDA) 150. Head Drive Assembly 150 is also coupled to microprocessor 110. The other electronics block 170 along with AT interface 130 make up the disk controller of the disk drive. In operation, commands are sent to the disk drive to read or write data. This data is transferred back to the computer. When the data information is transferred through the AT interface 130 and bus 160 to the host 120 or microprocessor 110, AT task file block 140 is updated by the microprocessor with the status information. These task file registers (that are updated after each data block or sector is transferred for providing the physical address of data sectors being transferred) comprise a sector count register, a sector number register, a drive/head number register, a cylinder low register and a cylinder high register.

The AT sector number register is a dual-ported, read/write register available to both the host and microprocessor. This register is an 8 bit parameter register used to provide the sector ID. This register is used to specify the starting sector number for the current/read write sector command. This register is usually incremented by the local microcontroller after each sector is transferred by the host and controller, or transferred from the controller to the host (read operation).

When the sector number register is incremented high enough so that the register value reaches the largest sector ID on the track, (the upper bound of the sector number register), the next time a data sector is transferred, the microprocessor must reset the register for proper updating. The microprocessor stores this upper bound value and prevents the register from incrementing above this value.

The AT sector count register is used to specify the number of sectors to be transferred during a read/write sector command. This register is decremented by the local microcontroller usually after each sector is transferred. If this register is loaded with zero then 256 sectors are transferred.

The AT drive/head register is an 8 bit register used by the host to specify the head number and the drive number. In addition, bit four of this register is used to select one of the two drive status registers, drive zero status register or drive one status register, accessible from the host. Bits 3-0 contain the binary coded address of the head to be selected. In previous AT task files, the microprocessor changes the head address as each track or cylinder boundary is crossed.

The AT cylinder low register is used to specify the lower eight bits of the disk cylinder address. This register, in conjunction with the cylinder high register, constitutes a 16-bit cylinder address. This register is incremented by the local microcontroller usually as each cylinder boundary is crossed. At the end of the command, this register is updated to reflect the current cylinder number.

The cylinder high register contains the high order bits of the starting cylinder address for any disk access. At the end of the command, this register is updated to reflect the current cylinder number. The most significant bits of the cylinder address are loaded into the cylinder high register.

Upon completion of each data sector transfer, the registers described above must be updated with the current sector, head, and cylinder information. This process, in prior art, is typically performed by the system microprocessor. This requires that the microprocessor maintain, increment and reload each of the task file registers for each block of data transferred. Unfortunately, this reduces the available microprocessor bandwidth and increases the time over-head in transferring data from the disk drive to the host computer. It is desirable to have the microprocessor bandwidth free from maintaining the task file register values. If a single microprocessor is used in disk drives to support all the drive functions, including task file updates, microprocessor bandwidth may not be available to maintain the task file register values. It is desirable to free the microprocessor from updating the task file registers.

SUMMARY OF THE INVENTION

The present invention automates the operation of the AT task file registers used in hard disk drives and hard disk controller systems. The present invention provides registers that interface between the disk controller circuit and the host computer. The invention utilizes four 8-bit digital upcounters, one 4-bit digital upcounter, an 8-bit data register and a 4-bit data register. These counters indicate the physical address of the sector of data being transferred and are incremented or reloaded as required as each sector of data is transferred. The present invention employs the 8-bit data register, the maximum sector register, to hold the number of sectors per track on the drive and the 4-bit register, the maximum head register, to hold the number of heads on the disk drive. Then the counters are reloaded or incremented as required based upon the contents of the maximum head and maximum sector registers without microprocessor support after each sector is transferred.

The sector counter register of the present invention is decremented automatically after each data sector has been transferred to or from the host to or from the disk drive. The sector number register value is updated automatically in the present invention by being compared with the value in the maximum sector register after each sector is transferred. After each comparison the sector number register is loaded with one if its value is equal to the maximum sector register. Otherwise, it is incremented. The drive/head register is also updated automatically in the present invention by being compared to the value in the maximum head register when the sector count register is reloaded. After each comparison the drive/head register is loaded with zero, if the lower 3 bits of the drive/head register equal the maximum head register. Otherwise it is incremented. The cylinder low and cylinder high register values are also updated automatically in the present invention. The cylinder low register value is updated based on the value stored in the drive/head register, and the cylinder high register value is subsequently updated based on the value stored in the cylinder low register. External circuitry (typically a microprocessor) is not required in any of these operations. Having an automatic update of the AT task file is desirable for it reduces the command overhead and microprocessor bandwidth requirement in supporting the AT task file. The present invention is compatible with the ATA (AT Attachment) Specification, (ANSI standardization or BIOS compatibility).

DETAILED DESCRIPTION OF THE INVENTION

This invention relates to an apparatus for providing registers that interface between a disk controller circuit and a host computer. In the following description, numerous specific details, such as type of registers, number of tracks, etc., are described in detail to provide a more thorough description of this invention. It will be apparent, however, to one skilled in the art, that the invention may be practiced without these specific details. In other instances, well known features have not described in detail so as not to unnecessarily obscure the present invention.

The present invention provides circuitry to improve the performances of the controller by reducing the number of functions performed by the microprocessor. This circuitry includes automatic updating of the task file registers. The task file registers collectively indicate the physical address of the sector of data being transferred, and these registers are incremented or reloaded as required as each sector of data is transferred. For example, when executing the write multiple or read multiple commands, the sector number register of the task file is automatically incremented as each sector is transferred, up to the sector number specified by the maximum sector register. After this value is reached, the sector number register rolls over to one, and the drive/head register is incremented.

Figure 4:
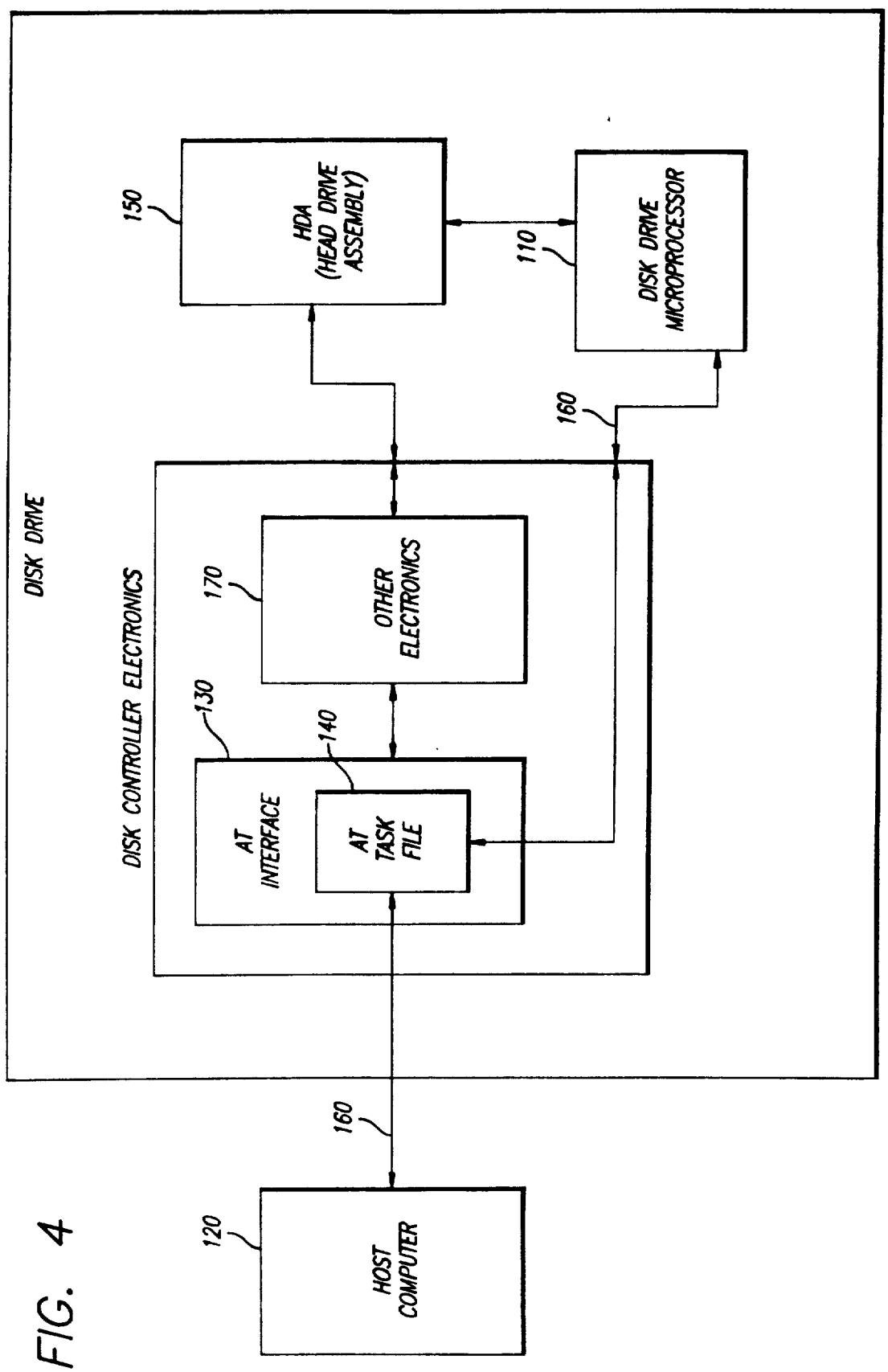
FIG. 4 is a block diagram of a host computer/AT bus/disk drive system.

FIG. 4 is a block diagram of a host computer/AT bus/disk drive system. In FIG. 4, host 120 is coupled to bus line 160 which is coupled to AT interface 130. Within AT interface block 130 is AT task file registers block 140. AT interface 130 is also coupled to disk drive microprocessor 110 through bus 160. Disk drive processor 110 is coupled to HDA 150. FIG. 4 illustrates how the host and disk drive processor communicate with each other when data sectors are transferred to or from the host to or from the disk drive. The AT task file registers 140 of AT interface 130 provide the physical address of the data sectors being transferred. As can be seen in FIG. 4, both disk drive processor 110 and host 120 access AT interface 130 through bus 160. The system of FIG. 4 is designed so that host 120 and disk drive processor 110 can only access AT interface 130 at separate times. In the present invention, AT interface 130 has been designed so that the AT task file registers in block 140 are automatically updated without any microprocessor support.

Figure 1:
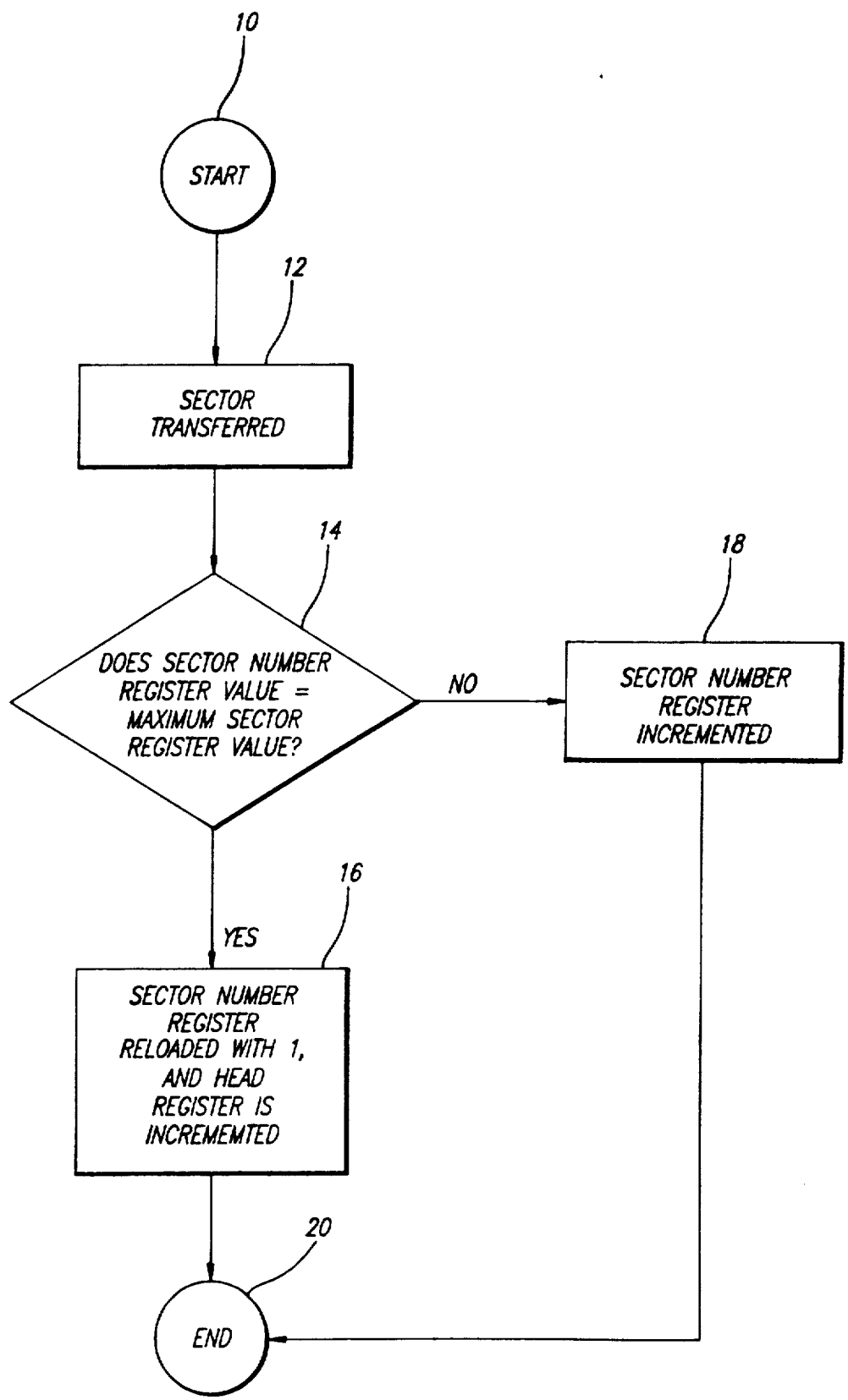
FIG. 1 is a flow diagram describing the updating process of the sector number register value.

Referring to FIG. 1, a flow chart describing the update of the sector number register value as well as the relationship of the head register to the sector number register is illustrated. The update begins at start block 10. At step 12, a data sector is transferred from the disk drive to the host. At decision block 14, the argument "does sector number register value equal maximum sector register value?" is made. If the argument is true, the system proceeds to step 16.

At step 16, the sector number register value is reset at step 16. Also at step 16, the drive/head register is incremented automatically.

If the argument at decision block 14 is false, the system proceeds to step 18. At step 18, the sector number register is incremented automatically and the system proceeds to step 20, the end.

The maximum sector register of the present invention stores the largest sector ID on the track written by the microprocessor. Since the maximum sector register is the upper bound of the sector number register, if the argument at decision block 14 is false, the sector number register is incremented. When the sector number register value is equal to the maximum sector register value, this implies that the sector number register has reached the upper bound of tracks and therefore the sector number register is automatically reset to 1. At the same time the sector number register is reset, this causes a carry to be generated to increment the drive/head register as specified by operation block 16.

Figure 2:
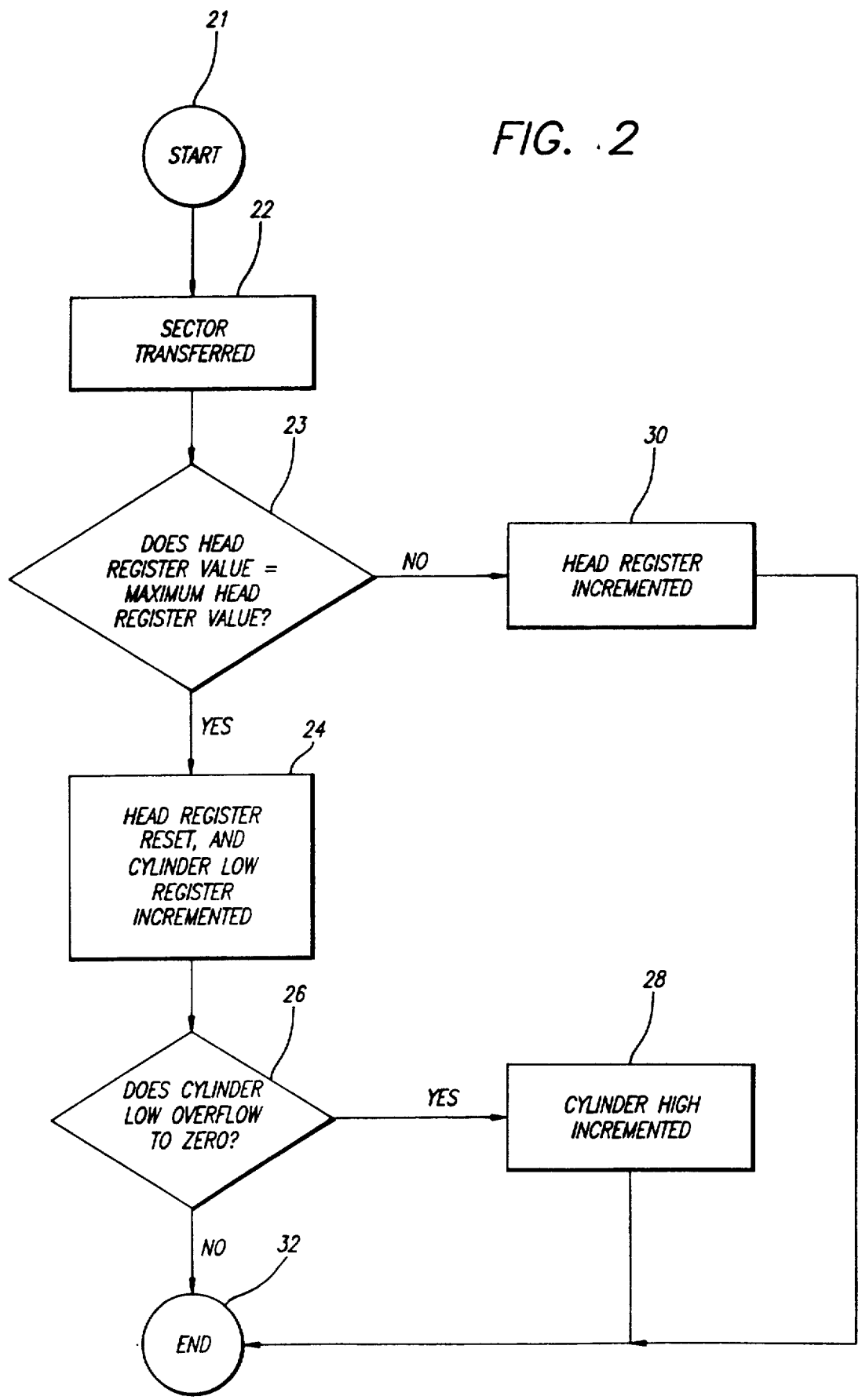
FIG. 2 is a flow chart describing the updating process of the head register value as well as the cylinder low and cylinder high register values.

Referring to FIG. 2, a flow chart describing the automatic updating of the drive/head register, as well as the cylinder low and cylinder high registers is illustrated.

The operation of FIG. 2 begins at start block 21 or from the host to the disk drive. At step 22, a data sector is transferred from the disk drive to the host or from the hose to the disk drive. At this point, the system proceeds to decision block 23 and the argument "does head register value equal maximum head register value?" is made. If the argument is true, the system proceeds to step 24. At step 24, the head register is reset and the cylinder low register is incremented. The system then proceeds to decision block 26. At decision block 26, the argument "does cylinder low overflow to zero?" is made. If the argument is false, the system proceeds to step 32.

If the argument at decision block 26 is true, the cylinder high register is incremented at step 28 and the system then proceeds to end block 32.

Returning to decision block 23, if the argument at decision block 23 is false, the system proceeds to step 30 and the head register is incremented. The system then proceeds to the end block 32.

Figure 3:
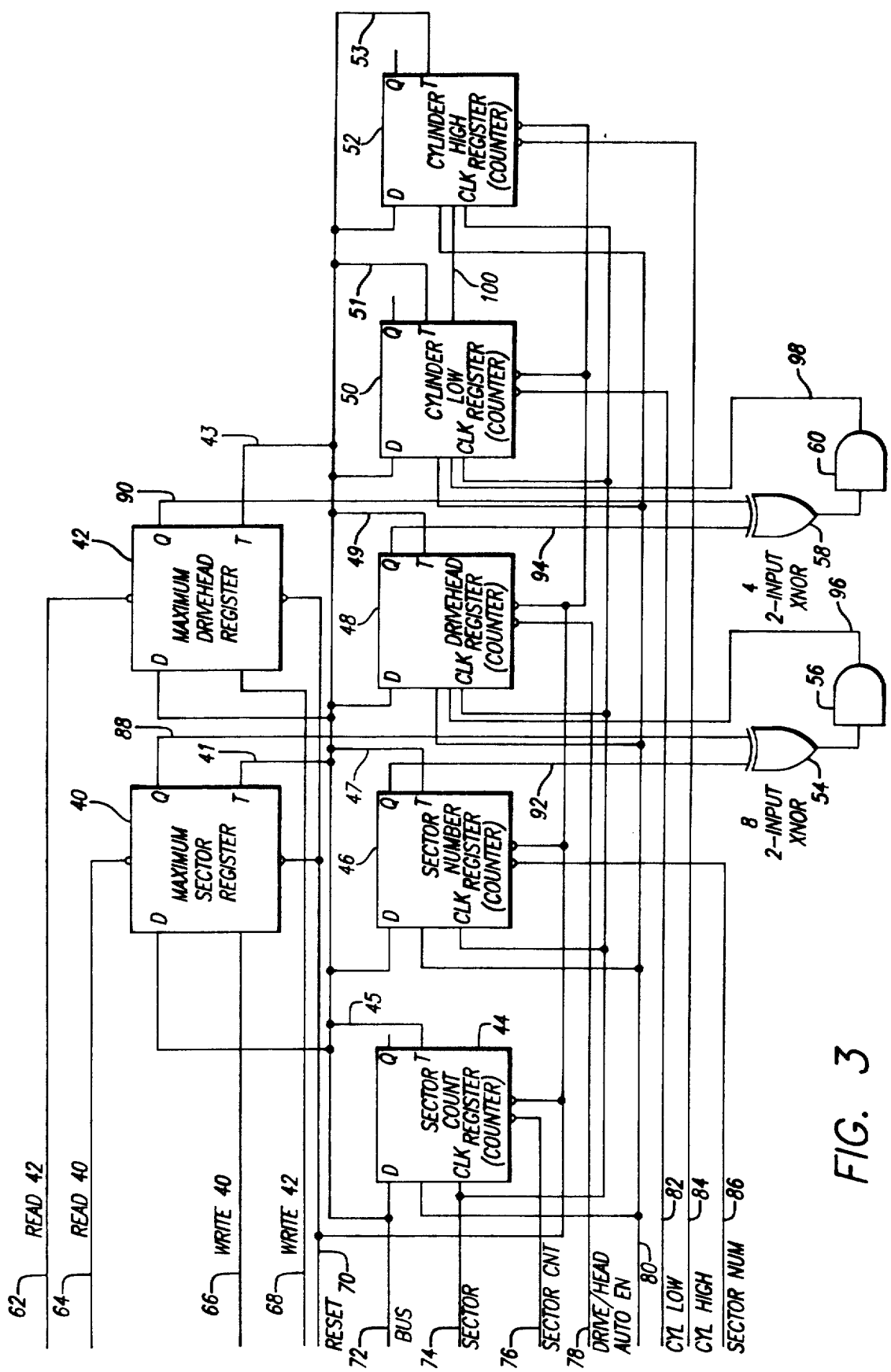
FIG. 3 is a block diagram illustrating the preferred embodiment of the automatic task file of the present invention.

A block diagram for the automation of the task file registers of the present invention is described in FIG. 3. FIG. 3 includes a data bus, 4 8-bit digital up counters (registers/counters), 1 4-bit digital up counter (register/counter), an 8-bit data register, and a 4-bit data register. The maximum sector register is an 8-bit data register, the maximum drive-head register is a 4-bit data register, the sector counter register, sector number register, cylinder low and cylinder high registers are 8-bit digital up counters, and the drive/head register is a 4-bit digital up counter.

In FIG. 3, microprocessor address/data bus 72 provides data input to and receives data output from all of the registers including maximum sector register 40, maximum drive/head register 42, sector count register 44, sector number register 46, drive/head register 48, cylinder low register 50 and cylinder high register 52. Sector count register 44 provides output signal 45 to the microprocessor address/data bus 72. Sector number register 46 also provides an output signal 47 to microprocessor address/data bus 72. Drive/head register 48 provides output signal 49 to microprocessor address/data bus 72. Cylinder low register 50 provides output signal 51 to microprocessor address/data bus 72. Cylinder high register 52 provides output signal 53 to microprocessor address/data bus 72. Maximum sector register 40 provides output signal 41 to microprocessor address/data bus 72. Maximum drive/head register 42 provides output signal 43 to microprocessor address/data bus 72. Output signals 41, 43, 45, 47, 49, 51 and 53 are all tri-state inverted outputs of their respective registers. Bus 72 is accessible by either the microprocessor or the Host Computer.

Reset signal 70 is provided to maximum sector register 40, maximum drive/head register 42, sector count register 44, sector number register 46, drive/head register 48, cylinder low register 50 and cylinder high register 52. Sector signal 74 provides a clocking signal to sector count register 44, sector number register 46, drive/head register 48, cylinder low register 50 and cylinder high register 52. Auto task file enable signal 80 is provided to sector count register 44, sector number register 46, drive/head register 48, cylinder low register 50 and cylinder high register 52. Sector count load signal 76 is provided to sector count register 44. Drive/head load signal 78 is provided to drive/head register 48.

Cylinder low load signal 82 is provided to cylinder load register 50. Cylinder high load signal 84 is provided to cylinder high register 52. Sector number load signal 86 is provided to sector number register 46. Signals 62 and 68 are provided to maximum drive/head register 42 to enable read and write operations, respectively. Signals 64 and 66 are provided to maximum sector register 40 to enable read and write operations, respectively. Each bit from 8-bit output signal 88 from maximum sector register 40 is coupled to eight separate 2-input exclusive NOR gates which are represented in FIG. 3 by exclusive NOR gate 54. Each bit of 8-bit output signal 92 from sector number register 46 is also coupled to the eight separate 2-input exclusive NOR gates 54. The eight outputs from the eight exclusive NOR gates 54 are then provided to the eight input AND gate 56. The output signal 96 from the AND gate 56 is provided to the drive/head register 48 as a "count enable" signal.

Each bit of the 4-bit output signal 90 from maximum drive/head register 42 is provided to the four separate 2-input exclusive NOR gates which are represented in FIG. 3 by exclusive NOR gate 58. Also, each bit of the 4-bit output signal 94 from drive/head register 48 is coupled to the four 2-input exclusive NOR gates 58. The four separate outputs from exclusive NOR gates 58 are then provided to the four input AND gate 60. Output signal 98 from AND gate 60 is then provided to the cylinder low register 50 as a "count enable" signal.

When the task file is in its initial state, external circuitry (usually a microprocessor) loads the number of sectors that the drive uses into the maximum sector register 40 and the number of heads into maximum drive/head register 42. A data transfer is then initiated by the external circuitry. After each sector is transferred, external circuitry generates a pulse on the sector signal 74. The sector count register 44 is decremented by one on the falling edge of sector pulse 74. As shown in decision block 14 of FIG. 1, the value of sector number register 46 received from microprocessor address/data bus 72 is compared to the value stored in maximum sector register 40 using the eight exclusive NOR gates 54. Exclusive NOR gates 54 receive an 8-bit input from sector number register 46 as well as from maximum sector register 40. The eight exclusive NOR gates 54 represent the decision block 14 of FIG. 1. If all 8 bits of sector number register 46 are equal to the 8 bits of maximum sector register 40 (all eight exclusive NOR gate outputs are logic one), then the sector number register 46 has reached its upper bound and is loaded with one and the drive/head register 48 is incremented.

This decision represents block 16 of FIG. 1 which states that the sector number is reset to one and the head register is incremented.

As shown in FIG. 3, if all eight inputs received by AND gate 56 are logic one, then output signal 96 from AND gate 56 provides a signal to drive/head register 48 for the register to be incremented. If all eight inputs to AND gate 56 are not logic one, this indicates that the sector number register has not reached its upper bound. Then the sector number register 46 is incremented, as shown in block 18 of FIG. 1, and output 96 does not enable drive/head register 48 to count. At the same time, the value stored in maximum drive/head register 42 bits 0-3 are compared to the value of the bits 0-3 of drive/head register 48. This comparison is described in the flow chart of FIG. 2 which describes the updating process for the head, cylinder low and cylinder high registers. This comparison is made by using the four exclusive NOR gates 58 in conjunction with 4-input AND gate 60. NOR gates 58 are represented by decision block 22 of FIG. 2.

If all 4-bits of drive/head register 48 are equal to the bits of maximum drive/head register 42 (all four exclusive NOR gates output a logic one), this then implies that the drive/head register value is equal to the maximum drive/head register value. Then, AND gate 60 outputs signal 98 which enables cylinder low register 50 to increment by one. Also, drive/head register 48 bits 3-0 are cleared as represented by block 24 in FIG. 2. If the last increment of the cylinder low register forces the cylinder low register 50 to overflow to zero, then cylinder low register 50 asserts output signal 100 to cylinder high register 52, enabling cylinder high register 52 to increment its value. This process follows blocks 26 and 28 of FIG. 2. This series of steps of updating the task file registers is necessary to give the correct physical address of the data sector being transferred.

The outputs of the sector count, sector number, drive/head, cylinder low and cylinder high registers, are connected to the host data bus/microprocessor data bus 72 through separate tri-state inverters. When the BUSY signal is logic zero, the host can access these registers. When the BUSY signal is logic one, the microprocessor has access to these registers.

This automatic updating of the AT task file reduces the command overhead in microprocessor bandwidth requirement in supporting the AT task file. If a single microprocessor is used in disk drives to support all the drive functions including the host interface (with task file updates), microprocessor bandwidth may not be available to maintain the task file register values. By performing this function without microprocessor support, the present invention assists in reducing the microprocessor's bandwidth usage and helps make single microprocessor disk drive systems more efficient.

Thus an automatic updating operation of an IBM AT task file is described.

I claim:

1. A circuit for providing automation of operation of the IBM AT task file registers used for providing the physical address of data sectors being transferred and where said task file registers interface between a disk controller circuit and the IBM AT computer comprising:

an interfacing means;
    a first storage means coupled to said interfacing means for storing the number of sectors said drive controller circuit uses;
    a second storage means coupled to said interfacing means for storing a number of heads said disk controller circuit uses;
    a first counting means coupled to said interfacing means for specifying number of sectors to be transferred;
    a second counting means for specifying the starting sector number for any disk data access, said second counting means coupled to said interfacing means;
    a third counting means coupled to said interfacing means for specifying a drive and head number;
    a fourth and fifth counting means coupled to said interfacing means for specifying a disk cylinder address;
    a first comparing means coupled to said first storage means and said second counting means for determining updating of said second and third counting means;
    a second comparing means coupled to said second storage means and said third counting means for determining updating of said third, fourth and fifth counting means.

2. The circuit of claim 1 wherein said circuit is compatible with the ATA (AT Attachment) Specification (ANSI Standardization of BIOS compatibility).

3. The circuit of claim 2 wherein said first counting means is decremented automatically after each said data sector has been transferred between said computer and said disk controller circuit, said first counting means comprises an 8-bit down-counter with multiplex parallel load.

4. The circuit of claim 3 wherein said second counting means comprises an 8-bit up-counter with multiplex parallel load.

5. The circuit of claim 4 wherein said third counting means comprises a 4-bit up-counter with multiplex parallel load.

6. The circuit of claim 5 wherein said fourth and fifth counting means each comprise an 8-bit up-counter.

7. The circuit of claim 6 wherein said second comparing means comprises four exclusive NOR gates.

8. The circuit of claim 7 wherein said first comparing means comprises eight exclusive NOR gates.

9. In a AT interface block accessible by both the host and microprocessor in a computer, a method for improving the performance of the microprocessor by providing automation of the updating of the AT task file registers after a data sector has been transferred, comprising the steps of:

storing the number of sectors in a drive;
    storing the number of heads in said drive;
    updating automatically a sector count register after each said sector has been transferred;
    comparing said number of sectors to the value in a sector number register;
    incrementing said value is said sector number register if said sector number register value is not equal to said number of sectors;
    loading said sector number register with 1 and incrementing a drive/head register value if said sector number register value and said number of sectors is equal;
    comparing said number of heads to the value in said drive/head register;
    incrementing said value to said drive/head register if said number of heads is not equal to said value in said drive/head register;
    loading a zero in said drive/head register and incrementing a cylinder low register if said number of heads is equal to said value in said drive/head register;
    incrementing a cylinder high register only if value in said cylinder low register has been reset to zero.

* * * * *